(No Model.)

G. REISS.
WHIFFLETREE.

No. 428,950. Patented May 27, 1890.

Witnesses
Geo. W. Young
N. E. Oliphant

Inventor
George Reiss
By Stout & Underwood
Attorneys

UNITED STATES PATENT OFFICE.

GEORGE REISS, OF MILWAUKEE, WISCONSIN.

WHIFFLETREE.

SPECIFICATION forming part of Letters Patent No. 428,950, dated May 27, 1890.

Application filed November 13, 1889. Serial No. 330,139. (No model.)

*To all whom it may concern:*

Be it known that I, GEORGE REISS, of Milwaukee, in the county of Milwaukee, and in the State of Wisconsin, have invented certain new and useful Improvements in Whiffletrees; and I do hereby declare that the following is a full, clear, and exact description thereof.

My invention relates to whiffletrees; and it consists in certain peculiarities of construction and combination of parts to be hereinafter described with reference to the accompanying drawings, and subsequently claimed.

Figure 1:
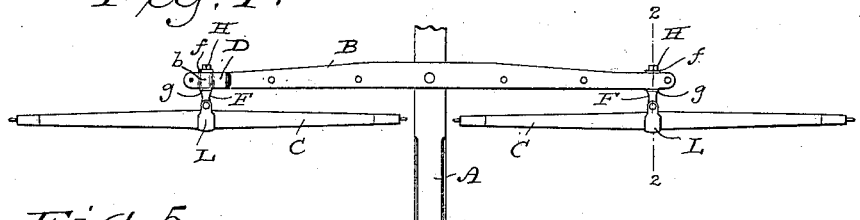
Figure 5:
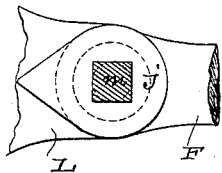
Figure 2:
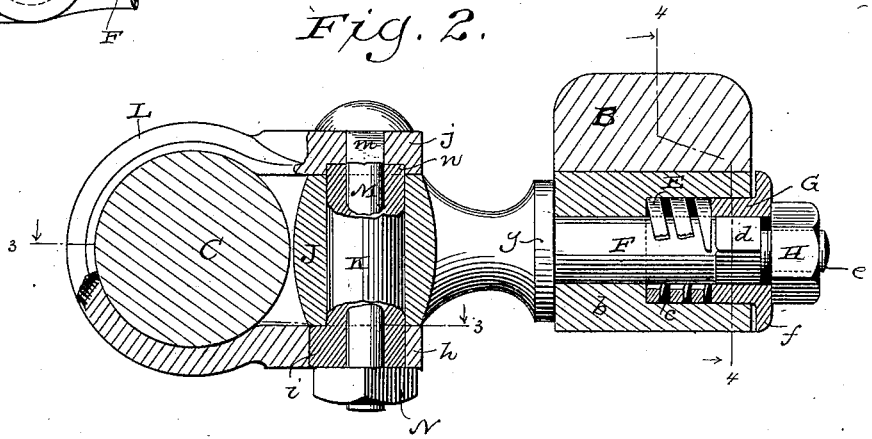
Figure 3:
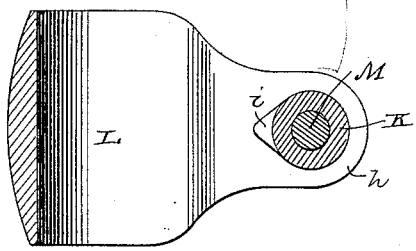
Figure 4:
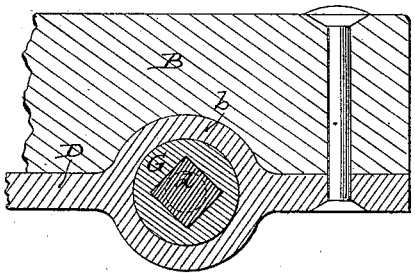

In the drawings, Figure 1 represents a plan view of a vehicle-tongue, doubletree, and singletrees, the latter being connected to the doubletree by my improved device; Fig. 2, a section taken on line 2 2 of Fig. 1; Figs. 3 and 4, sections respectively taken on lines 3 3 and 4 4 of Fig. 2; and Fig. 5, a plan view of a portion of my device, the head of a connecting-bolt being cut away.

Referring by letter to the drawings, A represents a vehicle-tongue, B a doubletree pivoted to the tongue, and C the singletrees connected to the doubletree. Each eye $b$ in the doubletree-iron D is countersunk from the rear for a certain distance to form a chamber $c$ for a spiral spring E, that surrounds a shank F and impinges against a sleeve G, inserted in said chamber, the interior of this sleeve being angular to fit an angular portion $d$ of said shank. The rear end $e$ of the shank is screw-threaded to engage a nut H, that is run up against the sleeve G, and the latter is provided with a stop-flange $f$, as best illustrated in Fig. 2.

By the construction and arrangement of parts just described it will be seen that the sleeve G turns with the shank F. Consequently there is no resistance on the part of the nut H, and the latter cannot work loose on said shank or wear against said sleeve, while at the same time the expansion of spring E will take up any wear that is occasioned by the frictional contact of the usual shoulder $g$ on the shank and the adjacent doubletree-iron D, whereby I prevent any rattling in the joint formed by said parts. At its forward end the shank F is provided with an eye J, and arranged within the latter is a bushing K, that extends beyond an extremity of said eye to engage an opening in one end $h$ of a clip L, that embraces the adjacent singletree, and the bushing is provided with an ear $i$ for engagement with a corresponding recess in said end of the clip. The other end $j$ of the clip L is provided with an angular opening that fits the angular portion $m$ of a bolt M, the latter being extended through the bushing K to engage with a nut N, that is run up against said bushing.

By the construction described in connection with the shank F and clip L it will be seen that both the bushing K and bolt M turn with said clip. Consequently there is no resistance on the part of the nut N, and the latter cannot work loose on said bolt or wear against said bushing, whereby I prevent any rattling in the joint thus formed.

As best illustrated in Fig. 2, the end $j$ of the clip L is recessed upon its inner side to receive the adjacent end $n$ of the bushing K, and thus the strain is taken off the bolt M, that connects said ends of the clip.

Having thus described my invention, what I claim as new, and desire to secure by Letters Patent, is—

1. A doubletree having countersunk eyes, sleeves angular upon the interior and inserted in the countersunk portions of the eyes, and singletree-shanks having their bearings in said eyes and made angular for a portion of their length to fit the sleeves, substantially as set forth.

2. A doubletree having countersunk eyes, sleeves angular upon the interior and inserted in the countersunk portions of the eyes, singletree-shanks having their bearings in said eyes and made angular for a portion of their length to fit the sleeves, and nuts arranged on the shanks adjacent to said sleeves, substantially as set forth.

3. A doubletree having countersunk eyes, spiral springs arranged in the countersunk portions of the eyes, sleeves angular upon their interior and inserted in said countersunk portions of the eyes to oppose the springs, singletree-shanks having their bearings in said eyes and made angular for a portion of their length to fit the sleeves, and nuts arranged on the shanks adjacent to said sleeves, substantially as set forth.

4. A shank provided with an eye, a bushing arranged in the eye, a clip fast at one end to the bushing, and a bolt fast to the other end of the clip and extended through said bushing, substantially as set forth.

5. A shank provided with an eye, a bushing arranged in the eye and provided with an ear, a clip having one end thereof fitted to the bushing and provided with a recess to engage said ear, the other end of the clip provided with an angular opening, and a bolt that extends through said bushing and has an angular portion fitted in said opening, substantially as set forth.

6. A doubletree having countersunk eyes, sleeves angular upon the interior and inserted in the countersunk portions of the eyes, singletree-shanks having their bearings in said eyes and made angular for a portion of their length to fit the sleeves, an eye on each shank, a bushing arranged in the eye, a clip fast at one end to the bushing, and a bolt fast to the other end of the clip and extended through said bushing, substantially as set forth.

7. A doubletree having countersunk eyes, spiral springs arranged in the countersunk portions of the eyes, sleeves angular upon their interior and inserted in said countersunk portions of the eyes to oppose the springs, singletree-shanks having their bearings in said eyes and made angular for a portion of their length to fit the sleeves, an eye on each shank, a bushing arranged in the eye, a clip fast at one end to the bushing, and a bolt fast to the other end of the clip and extended through said bushing, substantially as set forth.

8. A shank provided with an eye, a bushing arranged in the eye, a clip fast at one end to the bushing and having its other end recessed to receive said bushing, and a bolt fast to the latter end of the clip and extended through the bushing, substantially as set forth.

In testimony that I claim the foregoing I have hereunto set my hand, at Milwaukee, in the county of Milwaukee and State of Wisconsin, in the presence of two witnesses.

GEORGE REISS.

Witnesses:
N. E. OLIPHANT,
WM. KLUG.